(12) United States Patent
Marwah et al.

(10) Patent No.: US 9,910,861 B2
(45) Date of Patent: Mar. 6, 2018

(54) AUTOMATED INFORMATION LIFECYCLE MANAGEMENT USING LOW ACCESS PATTERNS

(71) Applicant: Oracle International Corporation, Redwood Shores, CA (US)

(72) Inventors: Vineet Marwah, San Ramon, CA (US); Hariharan Lakshmanan, Belmont, CA (US); Ajit Mylavarapu, Mountain View, CA (US); Prashant Gaharwar, San Carlos, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/826,075

(22) Filed: Mar. 14, 2013

(65) Prior Publication Data

US 2014/0095448 A1    Apr. 3, 2014

Related U.S. Application Data

(60) Provisional application No. 61/707,685, filed on Sep. 28, 2012.

(51) Int. Cl.
*G06F 17/30* (2006.01)
*G06F 3/06* (2006.01)

(52) U.S. Cl.
CPC ...... *G06F 17/30221* (2013.01); *G06F 3/0649* (2013.01); *G06F 17/30073* (2013.01);
(Continued)

(58) Field of Classification Search
None
See application file for complete search history.

(56) References Cited

U.S. PATENT DOCUMENTS

| 5,933,838 A | 8/1999 | Lomet |
| 7,031,994 B2 | 4/2006 | Lao et al. |

(Continued)

FOREIGN PATENT DOCUMENTS

WO     WO 01/82118 A2    11/2001

OTHER PUBLICATIONS

Lambert, Bob, "DMBI Tech Tip: Include Audit Columns on all Tables", CapTech Venrures, dated Jan. 12, 2011, 2 pages.

(Continued)

*Primary Examiner* — Son T Hoang
(74) *Attorney, Agent, or Firm* — Hickman Palermo Becker Bingham LLP

(57) ABSTRACT

A method, apparatus, and system for automated information lifecycle management using low access patterns in a database management system are provided. A user or the database can store policy data that defines an archiving action when meeting an activity-level condition on one or more database objects. The archiving actions may include compression, data movement, and other actions to place the database object in an appropriate storage tier for a lifecycle phase of the database object. The activity-level condition may specify the database object meeting a low access pattern, optionally for a minimum time period. Various criteria including access statistics for the database object and cost characteristics of current and target compression levels or storage tiers may be considered to determine the meeting of the activity-level condition. The policies may be evaluated on an adjustable periodic basis and may utilize a task scheduler for minimal performance impact.

30 Claims, 6 Drawing Sheets

(52) U.S. Cl.
CPC .. *G06F 17/30289* (2013.01); *G06F 17/30306* (2013.01); *G06F 17/30312* (2013.01); *G06F 17/30575* (2013.01)

(56) References Cited

U.S. PATENT DOCUMENTS

| | | | |
|---|---|---|---|
| 7,251,669 B1 | 7/2007 | Arora et al. | |
| 7,328,192 B1 | 2/2008 | Stengard et al. | |
| 7,496,589 B1 | 2/2009 | Jain et al. | |
| 8,547,379 B2 | 10/2013 | Pacheco | |
| 8,688,654 B2* | 4/2014 | Groseclose, Jr. | G06F 3/0608 707/693 |
| 8,832,142 B2 | 9/2014 | Marwah et al. | |
| 8,994,755 B2 | 3/2015 | Robinson | |
| 2003/0055807 A1 | 3/2003 | Lomet | |
| 2003/0101133 A1 | 5/2003 | DeFrancesco | |
| 2003/0105732 A1 | 6/2003 | Kagalwala et al. | |
| 2003/0236781 A1 | 12/2003 | Lei | |
| 2004/0098383 A1* | 5/2004 | Tabellion et al. | 707/3 |
| 2004/0117407 A1* | 6/2004 | Kumar et al. | 707/200 |
| 2005/0027749 A1 | 2/2005 | Ohno | |
| 2005/0149584 A1* | 7/2005 | Bourbonnais et al. | 707/204 |
| 2005/0256897 A1 | 11/2005 | Sinha | |
| 2006/0085485 A1 | 4/2006 | Shimshoni | |
| 2006/0218127 A1* | 9/2006 | Tate et al. | 707/3 |
| 2007/0088912 A1 | 4/2007 | Mukherjee | |
| 2007/0156790 A1 | 7/2007 | Sun Hsu et al. | |
| 2007/0198552 A1 | 8/2007 | Farrand | |
| 2007/0208665 A1* | 9/2007 | Ohara | 705/51 |
| 2008/0040505 A1* | 2/2008 | Britto et al. | 709/238 |
| 2008/0098045 A1 | 4/2008 | Radhakrishnan et al. | |
| 2008/0235183 A1* | 9/2008 | Draese et al. | 707/2 |
| 2008/0250073 A1 | 10/2008 | Nori et al. | |
| 2008/0294697 A1 | 11/2008 | Andrasak et al. | |
| 2009/0070382 A1 | 3/2009 | Agrawal et al. | |
| 2009/0177622 A1 | 7/2009 | Hu et al. | |
| 2009/0187544 A1* | 7/2009 | Hsu et al. | 707/3 |
| 2009/0198729 A1 | 8/2009 | Gong | |
| 2010/0077168 A1 | 3/2010 | Arakawa | |
| 2010/0274827 A1 | 10/2010 | Hix et al. | |
| 2010/0287178 A1 | 11/2010 | Lambert | |
| 2011/0106863 A1* | 5/2011 | Mamidi | G06F 17/30221 707/823 |
| 2011/0179066 A1 | 7/2011 | Cardno | |
| 2011/0282830 A1* | 11/2011 | Malige | G06F 17/30221 707/609 |
| 2012/0011329 A1* | 1/2012 | Nonaka | G06F 3/0604 711/154 |
| 2012/0030247 A1 | 2/2012 | Yambal et al. | |
| 2012/0042130 A1* | 2/2012 | Peapell | G06F 12/0866 711/126 |
| 2012/0137059 A1* | 5/2012 | Yang et al. | 711/104 |
| 2012/0137061 A1 | 5/2012 | Yang | |
| 2012/0144098 A1 | 6/2012 | Yang | |
| 2012/0144099 A1 | 6/2012 | Yang | |
| 2012/0173477 A1 | 7/2012 | Coutts | |
| 2012/0185648 A1* | 7/2012 | Benhase | G06F 12/08 711/118 |
| 2012/0233129 A1 | 9/2012 | Brinkmoeller et al. | |
| 2012/0260040 A1* | 10/2012 | Mallge | G06F 17/30584 711/117 |
| 2013/0155118 A1 | 6/2013 | Robinson | |
| 2013/0169666 A1 | 7/2013 | Pacheco | |
| 2013/0325326 A1 | 12/2013 | Blumenberg | |
| 2014/0033120 A1 | 1/2014 | Bental | |
| 2014/0095438 A1 | 4/2014 | Marwah et al. | |
| 2014/0095442 A1 | 4/2014 | Guo et al. | |
| 2014/0095449 A1 | 4/2014 | Marwah et al. | |
| 2014/0095450 A1 | 4/2014 | Marwah et al. | |
| 2014/0122778 A1* | 5/2014 | O'Brien | G06F 3/061 711/103 |
| 2014/0244623 A1 | 8/2014 | King | |
| 2015/0170382 A1 | 6/2015 | Bhatia | |

OTHER PUBLICATIONS

Ahmed et al., "Lifecycle Management of Relational Records for External Auditing and Regulatory Compliance", IEEE, dated 2011.
Lambert, Bob, "DMBI Tech Tip: Include Audit Columns on all Tables Cap Tech Consulting", dated Jan. 12, 2011, 2 pages.
Verma et al., "An Architecture for Lifecycle Management in Very Large File Systems", Mass Storage Systems and Technologies, dated 2005, IEEE, 9 pages.
Chen et al., "Information Valuation for Information Lifecycle Management", Autonomic Computing, dated 2005, 12 pages.
U.S. Appl. No. 13/750,873, filed Jan. 25, 2013, Restriction Requirement, dated Mar. 20, 2015.
U.S. Appl. No. 13/750,865, filed Jan. 25, 2013, Office Action, dated Mar. 23, 2015.
Chi, Ed Huai-Hsin, "A Framework for Information Visualization Spreadsheets", PhD diss., University of Minnesota, dated 1999, 160 pages.
Chi et al., "Principles for Information Visualization Spreadsheets", IEEE, Computer Graphics and Applications 4, dated 1998, 9 pages.
Ailamaki, Anastassia, et al, "Weaving Relations for Cache Performance," Proceedings of the 27$^{th}$ International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).
U.S. Appl. No. 13/804,394, filed Mar. 14, 2013, Advisory Action, dated May 11, 2016.
U.S. Appl. No. 13/804,884, filed Mar. 14, 2013, Advisory Action, dated Jun. 29, 2016.
Marwah, U.S. Appl. No. 13/804,884, filed Mar. 14, 2013, Final Office Action, dated Apr. 17, 2017.
Marwah, U.S. Appl. No. 13/804,581, filed Mar. 14, 2013, Office Action, dated May 19, 2017.
Marwah, U.S. Appl. No. 13/804,394, filed Mar. 14, 2013, Office Action, dated May 11, 2017.
Ren et al., "A New Buffer Cache Design Exploiting Both Temporal and Content Localities", IEEE, dated 2010, 11 pages.
Guo, U.S. Appl. No. 13/750,865, filed Jan. 25, 2013, Office Action, dated Jun. 23, 2017.
U.S. Appl. No. 13/804,884, filed Mar. 14, 2013, Final Office Action, dated Apr. 28, 2016.
U.S. Appl. No. 13/750,873, filed Jan. 25, 2013, Final Office Action Action, dated Jun. 2, 2016.
Marwah, U.S. Appl. No. 13/804,884, filed Mar. 14, 2013, Office Action, dated Sep. 29, 2017.
Guo, U.S. Appl. No. 13/750,865, filed Jan. 25, 2013, Interview Summary, dated Nov. 22, 2017.

* cited by examiner

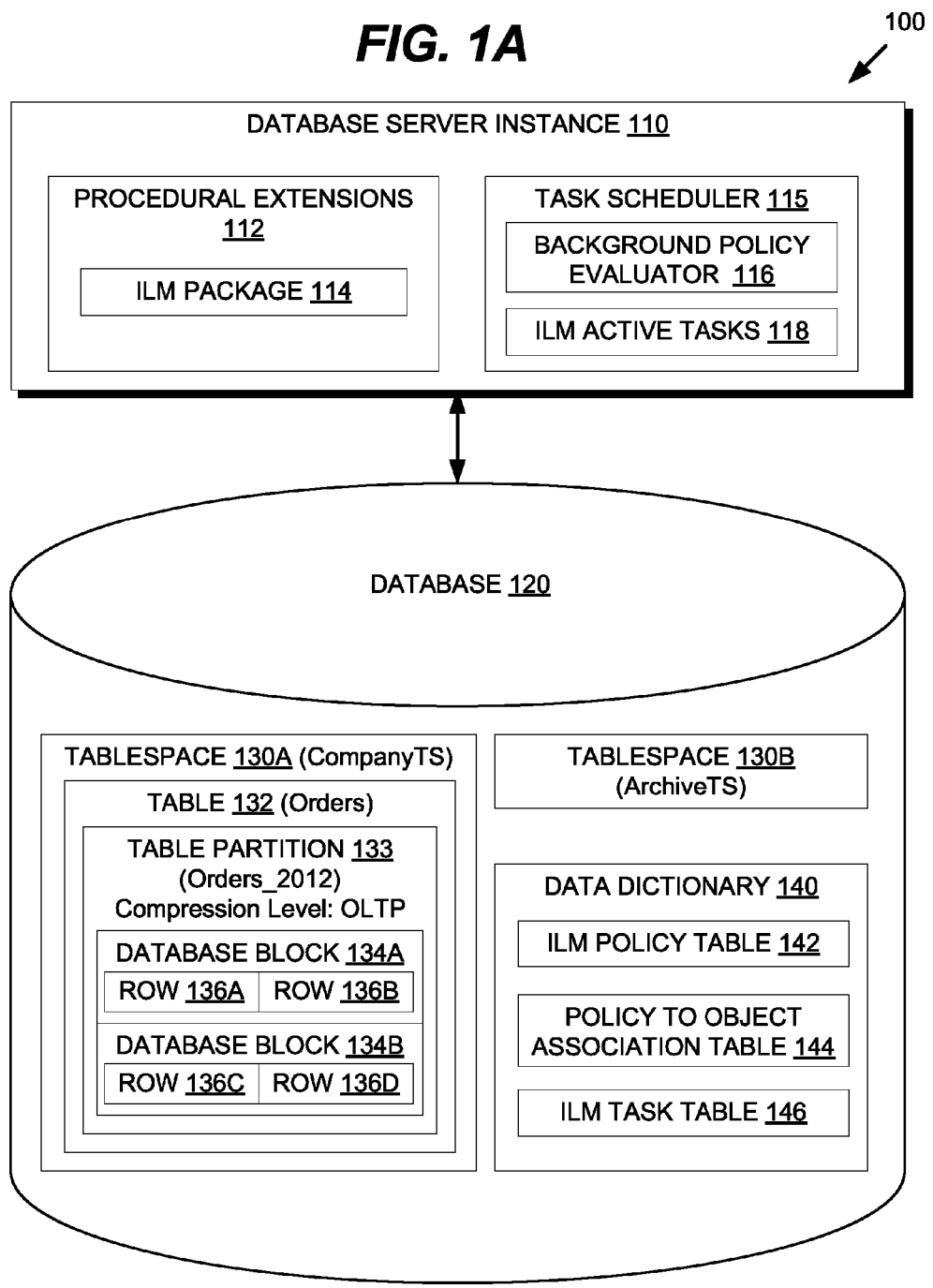

POLICY CREATION STATEMENT 150

{OBJECT}
 ILM ADD {POLICY | POLICY_NAME}
 {ACTION}
 {SCOPE}
 {CONDITION}

---

POLICY MANAGEMENT STATEMENT 151

{OBJECT} ILM {DELETE [ALL] |
              ENABLE [ALL] |
              DISABLE [ALL] }
 POLICY [POLICY_NAME]

---

OBJECT CLAUSE 152A

CREATE TABLE TableName |
ALTER TABLE TableName |
ALTER TABLE TableName MODIFY PARTITION PartitionName |
CREATE TABLESPACE TablespaceName DEFAULT |
ALTER TABLESPACE TablespaceName DEFAULT

---

ACTION CLAUSE 152B

COMPRESS FOR CompLevel |
TIER TO Tablespace_Name [READ ONLY]

---

SCOPE CLAUSE 152C

SEGMENT | GROUP

---

CONDITION CLAUSE 152D

AFTER {Num {DAY[S] | MONTH[S] | YEAR[S]} OF}
 LOW ACCESS

```
DATA DICTIONARY 140

ILM POLICY TABLE 142

POLICY 143A

Policy_Name: CompressOrdersTable
    Object: Orders (Table)
    Action: COMPRESS FOR ARCHIVE HIGH
    Scope: SEGMENT
    Condition: AFTER 3 MONTHS OF LOW ACCESS
```

FIG. 1D

BACKGROUND POLICY EVALUATOR 116 (At Time T1)

ACCESS STATISTICS 160

Object: Orders_2012
Reporting period: Last 3 months prior to time T1
Row accesses: 10
Table scans: 2000
DML statements: 0
Index lookups: 0

ILM TASK TABLE 146

ILM TASK 147

Policy: CompressOrdersTable
Execute for Object: Orders_2012
State: Inactive

TABLE PARTITION 133 (Orders_2012)

DATABASE BLOCK 134A
Compression Level: Archive High

| ROW 136A | ROW 136B |
|----------|----------|
| ROW 136C | ROW 136D |

202
Store policy data to associate with one or more database objects, the policy data specifying an activity-level condition and an archiving action

204
Determine, by one or more criteria, that the activity-level condition is satisfied for at least one of the one or more database objects

206
In response to determining that the activity-level condition is satisfied, performing the archiving action

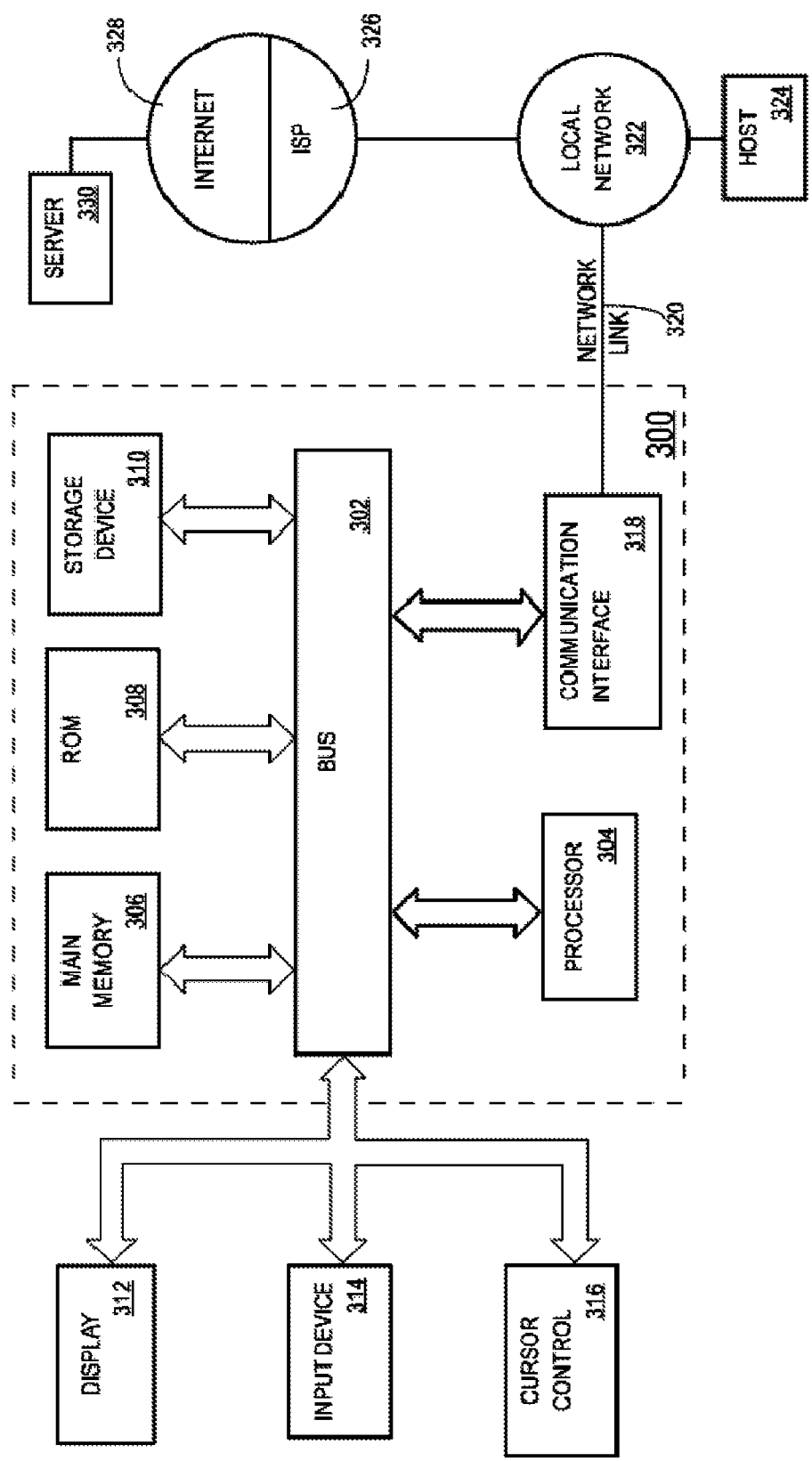

AUTOMATED INFORMATION LIFECYCLE MANAGEMENT USING LOW ACCESS PATTERNS

CROSS-REFERENCE TO RELATED APPLICATIONS; BENEFIT CLAIM

This application claims the benefit of U.S. Provisional Application No. 61/707,685, filed Sep. 28, 2012, which is hereby incorporated by reference in its entirety. This application is related to "Tracking Row and Object Database Activity into Block Level Heatmaps", U.S. patent application Ser. No. 13/804,884 filed Mar. 14, 2013; "Policy Driven Data Placement and Information Lifecycle Management", U.S. patent application Ser. No. 13/804,394 filed Mar. 14, 2013; "Techniques for Activity Tracking, Data Classification, and In Database Archiving", U.S. patent application Ser. No. 13/750,873 filed Jan. 25, 2013; and "Techniques for Lifecycle State Management and In-Database Archiving", U.S. patent application Ser. No. 13/750,865 filed Jan. 25, 2013; the entire contents of these patents are hereby incorporated by reference as if fully set forth herein.

FIELD OF THE INVENTION

The present disclosure relates to databases, and more specifically, to automated information lifecycle management using low access patterns.

BACKGROUND

Data is generated and stored at ever increasing rates in organizations both governmental and corporate. While some business data almost never loses its value, the usefulness of most data tends to decline over time until it has no further value for almost any purpose. Generally, the value of business information tends to be the greatest soon after the data is created and remains active for only a short period of time, at most a few years, after which the data's importance to the business, and thus the data's general usage, begins to decline. However, many businesses are constrained by factors, such as legal mandates, requiring data to be retained long after the data's usefulness has expired.

As a result, it has been commonly observed that users access at times as little as 10%-20% of the data stored within a database. The other 80-90% of data is rarely, if ever, accessed by users and yet contributes to the bulk of the storage costs required to maintain the database. To make matters worse, as the volume of data stored by the database increases, performance becomes degraded due to slower full table scans and elongated application upgrades.

Thus, faced with rising storage costs and deteriorating system performance, businesses have sought ways to efficiently manage their database's inactive data. At present, many businesses try to achieve this goal by resorting to third party archiving solutions that offload inactive data out of the database and into archival storage. While these solutions help to ameliorate the effects of accelerated data production, businesses employing third party archiving solutions tend to replace one problem with a host of others.

As one issue, third party archiving solutions tend to lack intimate knowledge of the format and contents of the database. For instance, many third party archiving solutions only work at the level of the file system and therefore can only archive at the granularity of a file. Thus, while a third party archiving solution may be able to offload the individual files that make up the database, the third party archiving solution may not be able to selectively offload individual database elements.

Furthermore, the third party archiving solution may detect inactive data based on file level metrics, such as the frequency or recency with which files are accessed, but may be unable to detect inactivity at the granularity of an individual database element. Consequently, when a database file contains both active and inactive data, third party archiving solutions may be unable to identify and archive only the inactive data. This issue can be exacerbated by database implementations that store data as flat files, where an entire table, or even the entire database, may be contained within a single large file on the file system.

To work around the inability of third party archiving solutions to separate inactive data beyond the granularity of a file, a database administrator may instead manually separate active and inactive data objects into different database files. For example, the database administrator may explicitly move inactive data objects to a separate tablespace, which can then be offloaded to archival storage. However, this workaround introduces heavy database administration burdens, as implementing and validating the required application schema modifications is not a trivial task. For example, the database administrator may be required to discern data access patterns from redo logs and develop customized scripts to separate the inactive data. Moreover, an offline database maintenance window is usually reserved to execute the schema modifications, negatively impacting database availability.

Based on the foregoing, there is a need for an efficient way of organizing inactive data in a database while simplifying database management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that depicts an example database management system for automated information lifecycle management using low access patterns, according to an embodiment;

FIG. 1B is a block diagram that depicts an example declarative statement syntax to define policies for automated information lifecycle management using low access patterns in a database management system, according to an embodiment;

FIG. 1C is a block diagram that depicts example policies for automated information lifecycle management using low access patterns in a database management system, according to an embodiment;

FIG. 1D is a block diagram that depicts an example evaluation of a policy for automated information lifecycle management using low access patterns, according to an embodiment;

FIG. 2 is a flow diagram that depicts a process for automated information lifecycle management using low access patterns, according to an embodiment;

FIG. 3 is a block diagram of a computer system on which embodiments may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a database management system ("DBMS") provides automated information lifecycle management using low access patterns. The term information lifecycle management refers to the effective management of information, such as database rows or records, throughout the various lifecycle phases of its useful life, from high relevance phases to low relevance phases, from creation to disposal. To implement information lifecycle management in a DBMS, a user or the DBMS can store policy data that defines an archiving action when meeting an activity-level condition on one or more database objects, which may include inherited child objects and grouped dependent objects.

The archiving action may place the one or more database objects into a specific storage tier, which may represent a type of storage medium and/or the technique used to compress or store the data on the storage medium, as defined further in Database Systems below.

The activity-level condition may specify the database object meeting a low access pattern or low access level. Optionally, the activity-level condition may also be specified for a minimum time period. A determination of whether the activity-level condition is satisfied may utilize one or more criteria, including access statistics of the database object such as a number of individual row accesses, a number of full table scans, a number of data manipulation language (DML) statements, and a number of index lookups. The access statistics may be derived from a segment level or block level heatmap of the database, as more fully described in the patent titled "Tracking Row and Object Database Activity into Block Level Heatmaps". The one or more criteria may include one or more costs of changing a current compression level of the database object to a target compression level specified by the archiving action. Accordingly, the policies can provide data optimizations that consider the access characteristics, advantages, and disadvantages for each possible storage tier of the database object.

The policies may be evaluated on an adjustable periodic basis, where an associated archiving action is performed for each database object meeting the activity-level condition. The archiving actions may be queued as tasks for processing by a resource aware task scheduler, allowing the tasks to be carried out automatically in the background with minimal overhead and database performance impact. Thus, policies may be used to defer compression and other high overhead actions to the background. Tasks on the same database object may also be consolidated where possible for greater efficiency.

Since policy evaluation occurs in the background without any user intervention, management and administration tasks may be limited to an initial definition of the policy data, which may even be generated automatically by the DBMS. By defining policies on a tablespace and utilizing policy inheritance, the policies can also be automatically associated with future database objects. Since the database management system can determine the access costs to the database object by using knowledge concerning the advantages and disadvantages of each storage tier for each type of data access, data optimization actions can occur automatically without requiring the user to understand and set detailed parameters for the optimizations. Accordingly, a database management system can implement automated information lifecycle management using low access patterns while providing high performance and low maintenance.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database object such as a tablespace or a segment may be assigned to a particular storage tier. A storage tier denotes a particular balance between access speed and storage cost. Each storage tier may represent a different type or quality of storage medium. In general, as the access speed of a storage medium increases the price to purchase that storage medium tends to increase as well. As a result, many businesses have a limited amount of premium storage space with the fastest access speed and a much larger amount of secondary or tertiary storage space which is slower, but cheaper to purchase in bulk. Thus, in order to maximize the performance of a DBMS, data with higher operational relevance can be placed on faster storage mediums, such as top-quality disk drives, while data with lesser operational relevance can be placed on slower storage mediums, such as optical disks or tape drives.

Each storage tier may also represent a storage area where the data is compressed using a different technique. Similar to the choice of storage medium, each compression technique also represents a tradeoff, in this case between access speed and storage space. More specifically, compression techniques that achieve higher compression ratios also tend to take longer to decompress when accessing the data. Thus, in order to maximize the performance of a database management system, data with higher operational relevance can be stored uncompressed to allow faster access, while data with lower operational relevance can be compressed to save space. Storage tiers may represent a combination of both storage medium and the technique used to compress or store data on the storage medium.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard),or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

FIG. 1A is a block diagram that depicts an example database management system 100 for automated information lifecycle management using low access patterns, according to an embodiment. Database management system 100 of FIG. 1A includes database server instance 110 and database 120. Database server instance 110 includes procedural extensions 112 and task scheduler 115. Procedural extensions 112 include information lifecycle management (ILM) package 114. Task scheduler 115 includes background policy evaluator 116 and ILM active tasks 118. Database 120 includes tablespace 130A, tablespace 130B, and data dictionary 140. Tablespace 130A includes table 132. Table 132 includes table partition 133. Table partition 133 includes database block 134A and database block 134B. Database block 134A includes row 136A and row 136B. Database block 134B includes row 136C and row 136D. Data dictionary 140 includes ILM policy table 142, policy to object association table 144, and ILM task table 146.

While database management system 100 only shows a single database server instance 110, embodiments may include multiple database server instances supported by one or more nodes. Thus, database management system 100 may be a multi-node database system. Further, while database 120 is shown as stored on a single storage element, database 120 may be supported by any type of underlying storage volume such as tiered storage and disk arrays across multiple local and/or networked physical disks. For example, tablespace 130A may be stored on a high cost, high performance array of solid state disks, whereas tablespace 130B may be stored on a low cost array of hard disk drives. The storage volumes may be interfaced using an automatic storage manager, a logical volume manager, a clustered file system, or another storage layer.

Database server instance 110 is a server instance of database 120. ILM policies for database 120 can be defined through the use of new ILM policy statements issued to database server instance 110. Database server instance 110 may also support procedural commands via procedural extensions 112, for example by supporting Procedural Language/Structured Query Language (PL/SQL). Accordingly, ILM package 114 may also be provided, allowing database users and applications to perform advanced management and customization of ILM policies.

In some embodiments, the ILM policies may be hardcoded. In other embodiments, the ILM policies may be defined in a configuration file, which may be provided by database management system 100. In this manner, database management system 100 can provide an automated ILM configuration without requiring the user to specifically state the individual policy components. For example, database management system 100 may analyze available tablespaces, compression levels, user data, and activity patterns, and based on this, formulate a comprehensive ILM plan and the policy data to implement the ILM plan.

Once a policy statement is received by database server instance 110, it may be parsed and stored as policy data within ILM policy table 142 of data dictionary 140. Thus, the policy data is metadata that describes an associated ILM policy. As discussed above, the policy data may also be hardcoded or may be provided automatically by database management system 100. The policy data may be associated with specific database objects in policy to object association table 144. Since policies can be inherited from parent objects, policy to object association table 144 may map a policy to one or more database objects at different scopes within database 120. For example, a policy specified on tablespace 130A may be associated with tablespace 130A at the tablespace scope, with table 132 at the table scope, and with table partition 133 at the table partition scope. Thus, the one or more database objects may be derived from child inheritance of a parent object specified in the policy statement. Furthermore, any newly created child objects of the parent object, or tablespace 130A, will also be associated with the policy specified on tablespace 130A.

Task scheduler 115 may be a multi-instance and resource aware task scheduler that can schedule and delegate tasks to database instances based on free resources, such as memory and processing cycles. On a customizable periodic schedule, background policy evaluator 116 may evaluate each policy in ILM policy table 142. If a policy has its condition satisfied with respect to any of the mappings in policy to object association table 144, then a task may be generated for that mapping, with the task queued into ILM task table 146. Conditions that can occur only once for a particular database object may be disabled after triggering to reduce future parsing time.

Task scheduler 115 may operate in the background, consuming the queue in ILM task table 146 to delegate tasks to database instances according to available resources, such as memory and processor cycles. Thus, tasks from ILM task table 146 may be loaded into ILM active tasks 118 for execution by database server instance 110, which may occur while database 120 is online. Ongoing status of running ILM tasks and results of finished or failed ILM tasks may also be maintained within ILM task table 146. Data structures of database management system 100 such as redo and undo records may be utilized to roll back, recover, and retry failed ILM tasks.

Process Overview

With a basic outline of database management system 100 now in place, it may be instructive to review a high level overview of the processing steps to define and carry out an ILM policy. Turning to FIG. 2, FIG. 2 is a flow diagram that depicts a process 200 for automated information lifecycle management using low access patterns, according to an embodiment.

Receiving a Declarative Policy Statement

At block 202 of process 200, referring to FIG. 1A, database server instance 110 stores policy data to associate with one or more database objects in database 120, the policy data specifying an activity-level condition and an archiving action. The policy data may be parsed from a declarative database statement in a database language, which may be received from a database client user or application. A detailed breakdown of an exemplary syntax for the policy statement is shown in FIG. 1B. In other embodiments, the policy data may be hardcoded or provided from a configuration file, which may be automatically provided by database management system 100.

FIG. 1B is a block diagram that depicts an example declarative policy statement syntax to define policies for automated information lifecycle management using low access patterns, according to an embodiment. Diagram 101 of FIG. 1B includes policy creation statement 150, policy management statement 151, object clause 152A, action clause 152B, scope clause 152C, and condition clause 152D.

Policy creation statement 150 shows the various component clauses for a database statement that creates an ILM policy. First is the {OBJECT} clause, which creates or modifies a database object. Next is the keyword "ILM ADD", which indicates that a new ILM policy is being defined for the database object created or modified in {OBJECT}. After the "ILM ADD" keyword, a friendly [POLICY_NAME] may be given to the ILM policy; otherwise, a schema-unique policy name may be generated automatically by using the POLICY keyword. After the policy name are various components specifying the details of the ILM policy: {ACTION} for an archiving action, {SCOPE} for the scope, and {CONDITION} for the activity-level condition.

Policy Object Clause

As discussed above, the {OBJECT} clause creates or modifies one or more database objects. Thus, examples are shown in object clause 152A to create a table, to modify a table, and to modify a table partition. In the case of creating or modifying tablespaces, the keyword "DEFAULT" is always appended to the end to emphasize that policies attached to tablespaces propagate hierarchically to child objects of the tablespace. Thus, any future created tables, table partitions, indexes, and other database objects within the tablespace will inherit the defined policy by default. While not specifically shown in object clause 152A, a policy may also be defined on a schema-wide basis, affecting all database objects of a particular database user.

Policy Action Clause

The {ACTION} clause specifies an archiving action on the database object. An archiving action places the database object into an appropriate storage tier for a lifecycle phase of the database object, where the storage tier may represent a type of storage medium and/or the technique used to compress or store the data on the storage medium. Action clause 152B shows four example archiving actions. The first example archiving action compresses to specified CompLevel, which may include OLTP, QUERY LOW, QUERY HIGH, ARCHIVE LOW, and ARCHIVE HIGH, in order of lowest to highest compression level. The OLTP level may optionally specify the "INPLACE" keyword to prevent rows from being moved and consolidated, thereby avoiding index rebuilding.

The second example archiving action, "TIER TO", causes data movement of the database object into a target storage container, such as a tablespace. Typically, this is used to move low activity data from a high cost tablespace to a lower cost tablespace, such as from tablespace 130A to tablespace 130B in FIG. 1A. Optionally, the [READ ONLY] keyword may be specified to mark the target tablespace as read-only after moving the database object, which may help to accelerate backup operations.

Other archiving actions may also be specified that are not specifically listed in action clause 152B. For example, a "move" archiving action may be specified to rebuild and re-sort a database object such as an index-sorted table.

Policy Scope Clause

The {SCOPE} clause specifies the scope with respect to the database object. As shown in scope clause 152C, two scopes are defined. SEGMENT scope refers to the segment that contains the database object, for example the segment of a table. As discussed above in the Database Systems heading, a segment refers to an allocation of space for a specific database object such as a table. GROUP scope refers to the SEGMENT as well as any dependent objects, such as indexes and large objects (LOBs).

Policy Condition Clause

The {CONDITION} clause specifies an activity-level condition before the specified {ACTION} is triggered on the {OBJECT} to achieve the target compression level. Condition clause 152D may optionally specify a minimum time period defined by a number of days, months, or years. The activity-level condition may specify a low access pattern, or "LOW ACCESS", for the associated database objects. To determine whether the activity-level condition is satisfied, one or more criteria may be determined, including various access statistics of the database object and one or more costs of changing from a current compression level to the target compression level after performing the <ACTION> clause.

Policy Association

Once a policy statement is received according to the syntax shown in policy creation statement 150, database server instance 110 may parse the policy statement and record the parsed policy into ILM policy table 142. Additionally, the policy may be associated with the database object {OBJECT} as well as all child database objects according to policy inheritance. These associations may be recorded in policy to object association table 144.

ILM Policy Management

After a policy is created for a database object, the policy may be enabled, disabled, or deleted for the database object and its child objects by using the syntax shown in policy management statement 151. Additionally, ILM package 114 may be utilized to provide advanced policy management features. For example, policies may be assigned to execute at specific priority levels, which may affect the scheduling decisions of task scheduler 115. Additionally, a maximum number of concurrent task job executions may be configured, and resource utilization levels may be specified for all ILM tasks in general and/or for specific ILM task jobs. Policies may also be forced to immediately execute their archiving actions regardless of whether their conditions are met.

Additionally, policies may be set to evaluate according to a specified schedule. By default, background policy evaluator 116 may evaluate all policies in ILM policy table 142 according to a periodic time interval, for example every 15 minutes or by another interval calibrated by a database administrator. However, this interval may be too frequent for certain policies that require a long time to evaluate their conditions. In this case, policies may be set to evaluate during a scheduled maintenance window or according to a customized schedule, rather than the default periodic time interval of 15 minutes. Thus, the user or database administrator who creates a policy may further specify a customized schedule specific for the policy. In this manner, the evaluation of the policy conditions may be grouped according to different schedules, for example every 15 minutes, daily, weekly, and during maintenance windows.

Example ILM Use Case

To provide an example of recorded ILM policies using the syntax discussed above, FIG. 1C is a block diagram that depicts example policies for automated information lifecycle management using low access patterns in a database management system, according to an embodiment. Diagram 102 of FIG. 1C includes data dictionary 140. Data dictionary 140 includes ILM policy table 142. ILM policy table 142 includes policy 143A. With respect to FIG. 1C, like numbered elements may correspond to the same elements from FIG. 1A. While only a single policy 143A is shown for simplicity, ILM policy table 142 may include multiple policies.

Table Partition Compression Policy

ILM policy table 142 contains policy 143A to demonstrate an example ILM use case for database 120. As shown in policy 143A, the associated database object is the Orders table, or table 132. Due to policy inheritance, the table partitions of table 132, including table partition 133 are also associated with policy 143A in policy to object association table 144. For example, the Orders table may be partitioned by year of order, with Orders_2012 representing all orders for the year 2012.

New data in table partition 133 may initially belong to a high relevance lifecycle stage, and may thus be compressed to a high performance OLTP level of compression, as shown in FIG. 1A. When table partitions of the Orders table enter a low activity state, as determined by the condition "AFTER 3 MONTHS OF LOW ACCESS", then the table partitions are compressed to a higher ARCHIVE HIGH level of compression, as reflected in policy 143A, to reflect a low relevance lifecycle stage. A determination of the low activity state or the "LOW ACCESS" pattern is described in further detail below.

Policy Evaluation

Having established an example recorded ILM policy, process 200 may continue by using policy 143A as corresponding to the specific policy that was parsed as policy data in block 202. Accordingly, at block 204 of process 200, referring to FIG. 1A, database server instance 110 determines, by one or more criteria, that the activity-level condition in policy 143A is satisfied for at least one of the database objects specified by the policy statement. Since policy 143A specifies table 132 (Orders) as a parent object, policy to object association table 144 may be used to identify the child objects of table 132 that inherit policy 143A, such as table partition 133 (Orders_2012). Each identified database object may then be evaluated against policy 143A to determine whether the one or more criteria satisfy the activity-level condition.

Turning to FIG. 1D, FIG. 1D is a block diagram that depicts an example evaluation of a policy for automated information lifecycle management using low access patterns, according to an embodiment. Diagram 103 of FIG. 1D includes background policy evaluator 116, ILM task table 146, and table partition 133. Background policy evaluator 116 includes access statistics 160. ILM task table 146 includes ILM task 147. Table partition 133 includes database block 134A. Database block 134A includes row 136A, row 136B, row 136C, and row 136D. With respect to FIG. 1D, like numbered elements may correspond to the same elements from FIG. 1A.

Background policy evaluator 116, at time T1, initiates an evaluation of policy 143A with respect to table partition 133 (Orders_2012). As previously discussed, evaluation may occur at a default periodic interval or 15 minutes or by a custom schedule. Thus, T1 may indicate a time when the periodic interval or the custom schedule is triggered.

At time T1, background policy evaluator 116 may calculate access statistics 160. Access statistics 160 may be derived from stored statistics recorded over time by database management system 100, where the stored statistics are kept as metadata within database 120. Some portion of access statistics 160 may be derived by using a segment level or block level heatmap of database 120. A segment level or block level heatmap of database 120 may indicate activity such as a last accessed time, a last modified time, and a creation time for database blocks within database 120.

As shown in access statistics 160, with respect to table partition 133 (Orders_2012), there were 10 row accesses or individual accesses to particular rows, 2000 table scans of the entire table partition, 0 DML statements that modified the table partition, and 0 index lookups. Since policy 143A specifies a minimum time period of 3 months, access statistics 160 is generated for a reporting period of the last 3 months prior to time T1. Thus, even if background policy evaluator 116 is invoked on a periodic 15 minute basis, evaluation of policy 143A may be postponed until at least 3 months of access statistics are gathered. If policy 143A does not specify a minimum time period, then database server instance 110 may use a default time period or automatically generate a minimum time period, which may be based on the parameters of policy 143A. For example, past activity levels of the associated database objects may be analyzed and a minimum time period may be calibrated to provide a sufficient quantity of statistics that enables an accurate cost analysis estimate for moving to the higher ARCHIVE HIGH compression level.

Low Access Metric

To determine whether the activity-level condition of policy 143A is satisfied, the one or more criteria may include an access metric falling under a threshold for "LOW ACCESS". The access metric may be based on access statistics 160. Further, the access metric may be based on one or more costs of changing a current compression level of the database object to the target compression level specified in policy 143A. Given that the object, table partition 133, is already compressed at the "OLTP" level, as shown in FIG. 1A, the action of policy 143A effectively changes a compression level of table partition 133 from a current "OLTP" level to a target "ARCHIVE HIGH" level.

For example, each type of access in access statistics 160 may be given a particular weight value in an access metric, reflecting the cost of performing that particular access in the current OLTP storage tier. These weights are, however, adjusted according to the cost of performing the same type of access in the target ARCHIVE HIGH storage tier. If the access metric remains below a threshold determined by database server instance 110, then the "LOW ACCESS" activity-level condition is satisfied.

For example, starting with row accesses, since individual row accesses may be fairly quick when using OLTP compression as individual compression units can be independently accessed, the 10 row accesses may be initially weighted relatively low. However, because individual row accesses may become very expensive once using ARCHIVE HIGH compression, the weighting may be increased accordingly.

Moving to table scans, table scans when using OLTP compression may be weighted higher than an individual row access in OLTP, since the entire table must be read. On the other hand, since a table scan when using ARCHIVE HIGH compression may actually be even faster than uncompressed data, as the highly compressed data may require less I/O activity, the weighting for table scans may be adjusted downward to reflect the possible performance gains by compressing to ARCHIVE HIGH. Thus, an end result may be that table scans are weighted less when compared to other actions, such as individual row accesses and DML statements.

Next, with DML statements that may modify or create new data, a relatively low weighting may be provided for OLTP compression, since rows can be added or modified relatively easily with independent compression blocks. On the other hand, the same DML statements as applied to ARCHIVE HIGH compression may require an expensive recompression operation for a large chunk of data, possibly the entire table partition, as individual rows may be difficult to modify separately using such a highly compressed format. As such, DML statements may be adjusted to a much higher weight.

Thus, access statistics 160 can be analyzed to create an access metric that also integrates access costs for the database object within storage tiers before and after the archiving action, or for a current compression level and a target compression level specified in the policy. While the example for policy 143A specifically concerns compression, a similar cost analysis might be applied for moving between one tablespace to another, for example by additionally considering a cost of ownership to store the database object in each tablespace as one criterion when calculating the access metric. Thus, various criteria can be considered for the activity-level condition.

Database server instance 110 may determine the threshold for reaching a low activity state or "LOW ACCESS" according to knowledge of the storage tiers, heuristics, past data analysis, estimators, and other data. If the weighted access metric falls below the threshold, then the condition clause may be satisfied for policy 143A and the action clause may be immediately performed or queued for performing by task scheduler 115. Otherwise, the condition clause is not satisfied and the action clause is not performed.

For the present example, database server instance 110 may determine that the condition is satisfied. Even though access statistics 160 indicates a large number of expensive table scans, because those table scans may execute with higher performance in an ARCHIVE HIGH level of compression compared to the current OLTP level of compression, a cost analysis using the access metric above may indicate that the reduced access costs flowing from the performance gains justifies executing the policy action compared to the status quo of not executing the action. A different result may occur if access statistics 160 is mostly individual row accesses and DML statements, where an ARCHIVE HIGH compression level is less appropriate compared to OLTP.

Note that since the threshold for the low activity state is determined by database server instance 110 rather than being explicitly specified in policy 143A, the database user does not need to consider and worry about setting complex parameters and settings, as the database automatically makes the "LOW ACCESS" determination by using the process described above.

Index Maintenance

The number of index lookups and table scans in access statistics 160 may also be utilized to perform automatic index maintenance, such as creating, disabling, and deleting indexes. For example, if a large number of table scans occur, then an index might be automatically created. If an index exists but is rarely used, then the index may be disabled or even deleted. This feature can also be utilized for partial indexing.

Task Queing

At block 206 of process 200, referring to FIG. 1A and FIG. 1D, in response to determining that the activity-level condition is satisfied in block 204, database server instance 110 performs the archiving action. In some embodiments, database server instance 110 may immediately perform the archiving action in response to block 204. However, to minimize performance impact on database management system 100, database server instance 110 may instead perform a queuing of ILM task 147 into ILM task table 146 for executing the archiving action on the Orders_2012 table partition. Since block 204 determined that the "LOW ACCESS" activity-level condition of policy 143A was satisfied for at least one database object, ILM task 147 is populated as shown, indicating policy 143A, or the "CompressOrdersTable" policy, to be executed on Orders_2012 table partition, or table partition 133.

As shown in ILM task 147, the task is initially set to an "Inactive" state, awaiting execution. Task scheduler 115 may automatically retrieve and delegate ILM task 147 from the queue in ILM task table 146. However, in some instances, a database administrator may wish to view the queue of tasks and manually approve tasks before allowing execution. In this case, task scheduler 115 may only process queued tasks in ILM task table 146 that are approved by the user.

Task Execution

Once ILM task 147 is queued into ILM task table 146, database server instance 110 may perform ILM task 147. For example, task scheduler 115 may process a task queue in ILM task table 146 to delegate ILM task 147 to a specific database instance, for example as part of ILM active tasks 118 of database server instance 110. The status of ILM task 147 may thus be updated to "Active".

After database server instance 110 performs the archiving action specified in ILM task 147, the structure of table partition 133 may appear as shown in FIG. 1D, where table partition 133 is recompressed to the "ARCHIVE HIGH" level of compression. Since the "ARCHIVE HIGH" level may provide a higher compression ratio than the "OLTP" level, rows 136A-136D may all be contained in a single database block 134A, freeing space that was previously occupied by database block 134B. The status of ILM task 147 may be updated to "Completed", and ILM task 147 may be removed from ILM active tasks 118.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   storing, by a database management system, policy data to associate with a database table of a database managed by the database management system, the policy data specifying an activity-level condition based on a low access pattern and an archiving action, wherein
   the database comprises a plurality of storage tiers, each of the plurality of storage tiers being associated with a different performance characteristic and a different compression technique;
   the database table comprises a plurality of database objects stored in a plurality of data blocks,
   each database object of the plurality of database objects being stored in respective one or more data blocks of the plurality of data blocks;
   determining, by the database management system, based on one or more criteria and access statistics tracking access to database rows contained in the plurality of database objects, that the activity-level condition is satisfied for a portion of the plurality of database objects, wherein the portion of the plurality of database objects comprises one or more database objects of the plurality of database objects; and in response to the determining that the activity-level condition is satisfied, performing, by the database management system, the archiving action;

wherein the archiving action includes moving the respective one or more data blocks of each of the one or more database objects between particular storage tiers of the database;

wherein the moving the respective one or more data blocks between the particular storage tiers comprises compressing the respective one or more data blocks in to a target compression level based at least on the access statistics;

wherein the method is performed by one or more computing devices.

2. The method of claim 1, wherein the archiving action specifies the target compression level, and wherein the one or more criteria include one or more costs of changing a current compression level of the respective one or more blocks to the target compression level specified by the archiving action.

3. The method of claim 1 wherein the activity-level condition is based on a minimum time period.

4. The method of claim 1, wherein the one or more criteria include a number of row accesses on the one or more database objects.

5. The method of claim 1, wherein the one or more criteria include a number of data manipulation language (DML) statements on the one or more database objects.

6. The method of claim 1, wherein the one or more criteria include a number of table scans on the one or more database objects.

7. The method of claim 1, wherein the one or more criteria include a number of index lookups on the one or more database objects.

8. The method of claim 1, wherein the determining uses a block level heatmap of the database management system.

9. The method of claim 1, wherein the policy data is parsed from a declarative statement of a database language.

10. The method of claim 1, wherein the one or more database objects are derived from child inheritance of a parent object specified in a policy statement of the policy data.

11. The method of claim 10, further comprising associating the policy statement with a newly created child object of the parent object.

12. The method of claim 1, wherein the determining occurs on a periodic schedule.

13. The method of claim 1, wherein the performing of the archiving action is by using a resource aware task scheduler of the database management system.

14. The method of claim 1, wherein the moving the respective one or more data blocks between the particular storage tiers comprises moving the respective one or more data blocks to a target storage structure.

15. A non-transitory computer-readable medium storing one or more sequences of instructions which, when executed by one or more processors, cause:

storing policy data to associate with a database table of a database managed by a database management system, the policy data specifying an activity-level condition based on a low access pattern and an archiving action, wherein the database comprises a plurality of storage tiers, each of the plurality of storage tiers being associated with a different performance characteristic and a different compression technique;

the database table comprises a plurality of database objects stored in a plurality of data blocks, each database object of the plurality of database objects being stored in respective one or more data blocks of the plurality of data blocks;

determining, based on one or more criteria and access statistics tracking access to database rows contained in the plurality of database objects, that the activity-level condition is satisfied for a portion of the plurality of database objects, wherein the portion of the plurality of database objects comprises one or more database objects of the plurality of database objects; and in response to the determining that the activity-level condition is satisfied, performing the archiving action;

wherein the archiving action includes moving the respective one or more data blocks of each of the one or more database objects between particular storage tiers of the database;

wherein the moving the respective one or more data blocks between the particular storage tiers comprises compressing the respective one or more data blocks to a target compression level based at least on the access statistics.

16. The non-transitory computer-readable medium of claim 15, wherein the archiving action specifies the target compression level, and wherein the one or more criteria include one or more costs of changing a current compression level of the one or more blocks to the target compression level specified by the archiving action.

17. The non-transitory computer-readable medium of claim 15, wherein the activity-level condition is based on a minimum time period.

18. The non-transitory computer-readable medium of claim 15, wherein the one or more criteria include a number of row accesses on the one or more database objects.

19. The non-transitory computer-readable medium of claim 15, wherein the one or more criteria include a number of data manipulation language (DML) statements on the one or more database objects.

20. The non-transitory computer-readable medium of claim 15, wherein the one or more criteria include a number of table scans on the one or more database objects.

21. The non-transitory computer-readable medium of claim 15, wherein the one or more criteria include a number of index lookups on the one or more database objects.

22. The non-transitory computer-readable medium of claim 15, wherein the determining uses a block level heatmap of the database management system.

23. The non-transitory computer-readable medium of claim 15, wherein the policy data is parsed from a declarative statement of a database language.

24. The non-transitory computer-readable medium of claim 15, wherein the one or more database objects are derived from child inheritance of a parent object specified in a policy statement of the policy data.

25. The non-transitory computer-readable medium of claim 24, further comprising associating the policy statement with a newly created child object of the parent object.

26. The non-transitory computer-readable medium of claim 15, wherein the determining occurs on a periodic schedule.

27. The non-transitory computer-readable medium of claim 15, wherein the performing of the archiving action is by using a resource aware task scheduler of the database management system.

28. The non-transitory computer-readable medium of claim 15, wherein the moving the respective one or more data blocks between the particular storage tiers comprises moving the respective one or more data blocks to a target storage structure.

29. A database management system comprising one or more computing devices configured to:
    store policy data to associate with a database table of a database managed by the database management system, the policy data specifying an activity-level condition based on a low access pattern and an archiving action, wherein
        the database comprises a plurality of storage tiers, each of the plurality of storage tiers being associated with a different performance characteristic and a different compression technique;
        the database table comprises a plurality of database objects stored in a plurality of data blocks,
        each database object of the plurality of database objects being stored in respective one or more data blocks of the plurality of data blocks;
    determine, based on one or more criteria and access statistics tracking access to database rows contained in the plurality of database objects, that the activity-level condition is satisfied for a portion of the plurality of database objects, wherein the portion of the plurality of database objects comprises one or more database objects of the plurality of database objects; and
    in response to determining that the activity-level condition is satisfied, performing the archiving action;
    wherein the archiving action includes moving the respective one or more data blocks of each of the one or more database objects between particular storage tiers of the database;
    wherein the moving the respective one or more data blocks between the particular storage tiers comprises compressing the respective one or more data blocks to a target compression level based at least on the access statistics.

30. The database management system of claim 29, wherein the archiving action specifies the target compression level, and wherein the one or more criteria include one or more costs of changing a current compression level of the one or more data blocks to the target compression level specified by the archiving action.

* * * * *

UNITED STATES PATENT AND TRADEMARK OFFICE
CERTIFICATE OF CORRECTION

PATENT NO.       : 9,910,861 B2
APPLICATION NO.  : 13/826075
DATED            : March 6, 2018
INVENTOR(S)      : Marwah et al.

It is certified that error appears in the above-identified patent and that said Letters Patent is hereby corrected as shown below:

On page 2, Column 2, under Other Publications, Lines 42-43, delete "Action Action," and insert -- Action, --, therefor.

In Column 11, Line 26, delete "T1 ," and insert -- T1, --, therefor.

In Column 11, Line 32, delete "T1 ," and insert -- T1, --, therefor.

In Column 11, Line 49, delete "T1 ." and insert -- T1. --, therefor.

In Column 13, Line 36, delete "Queing" and insert -- Queuing --, therefor.

In Column 17, Line 15, in Claim 1, after "blocks" delete "in".

In Column 17, Line 26, in Claim 3, delete "claim 1" and insert -- claim 1, --, therefor.

In Column 20, Line 08, in Claim 29, before "determining" insert -- the --.

Signed and Sealed this
Eighteenth Day of September, 2018

Andrei Iancu
*Director of the United States Patent and Trademark Office*